Figure 3:
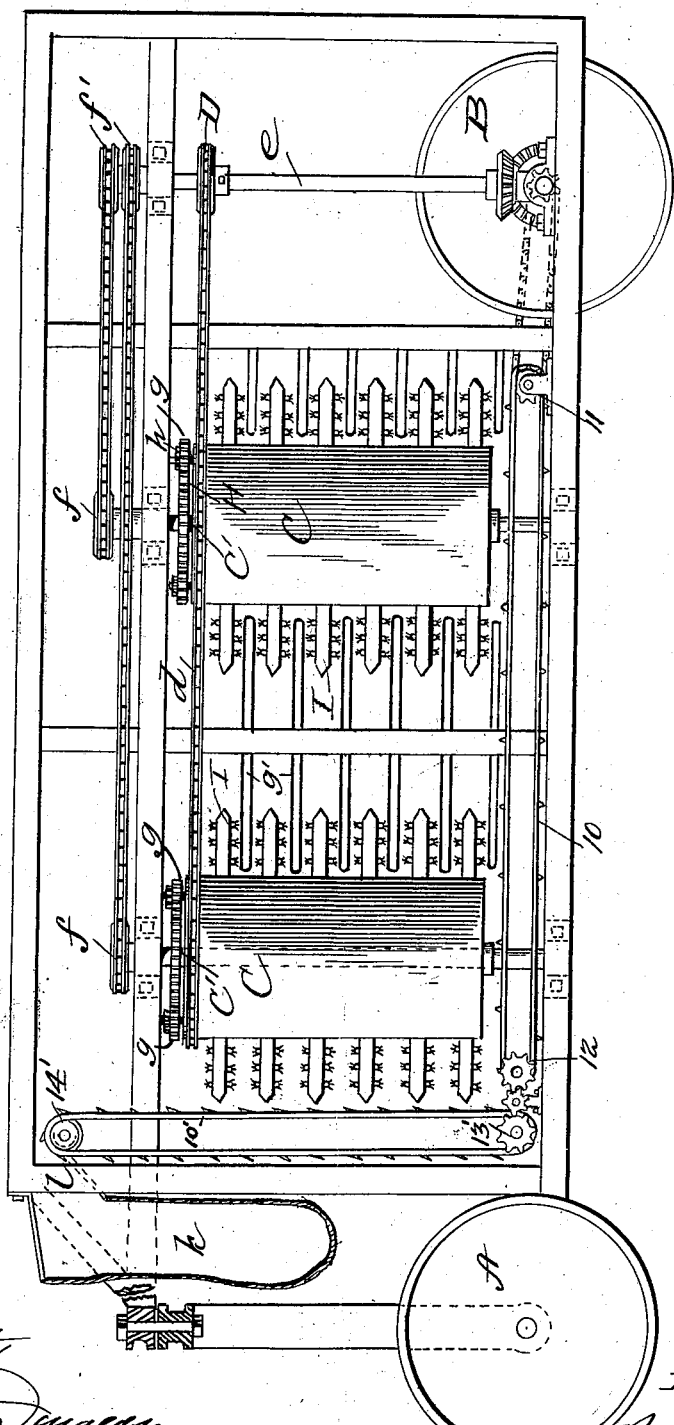

(No Model.) 3 Sheets—Sheet 1.
P. P. HARING.
COTTON PICKING MACHINE.
No. 587,201. Patented July 27, 1897.
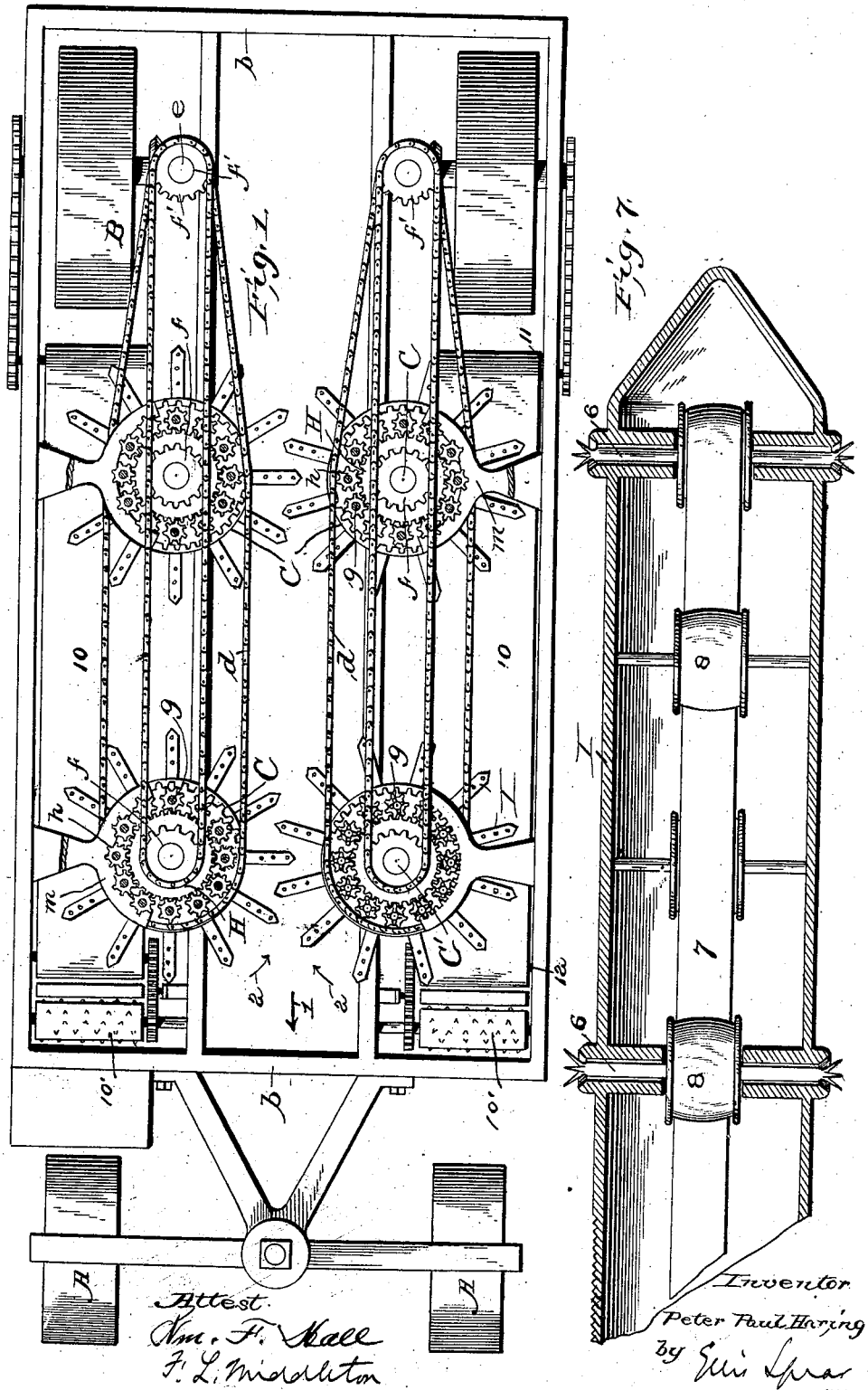
Attest
Wm. F. Hall
F. L. Middleton
Inventor
Peter Paul Haring
by Ellis Spear
Atty (No Model.) 3 Sheets—Sheet 2.
P. P. HARING.
COTTON PICKING MACHINE.
No. 587,201. Patented July 27, 1897.
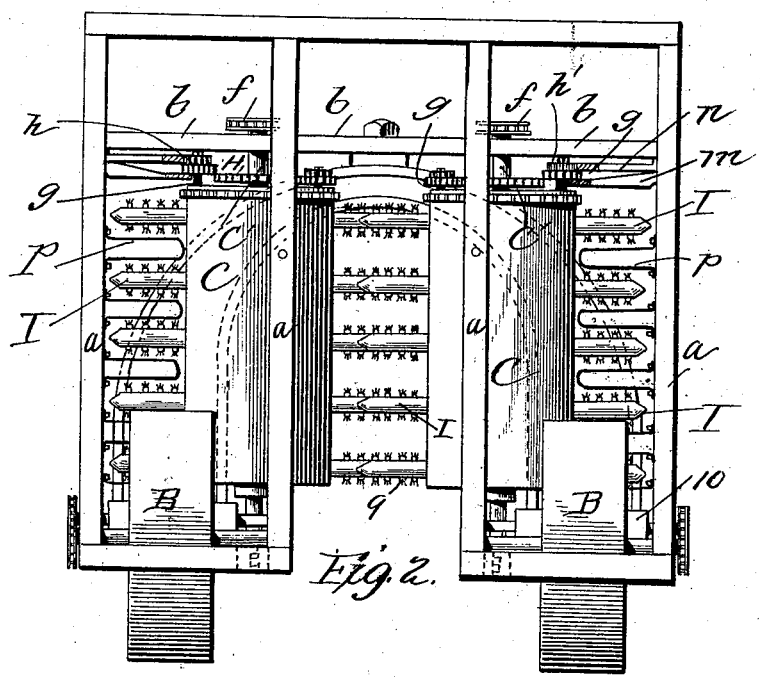
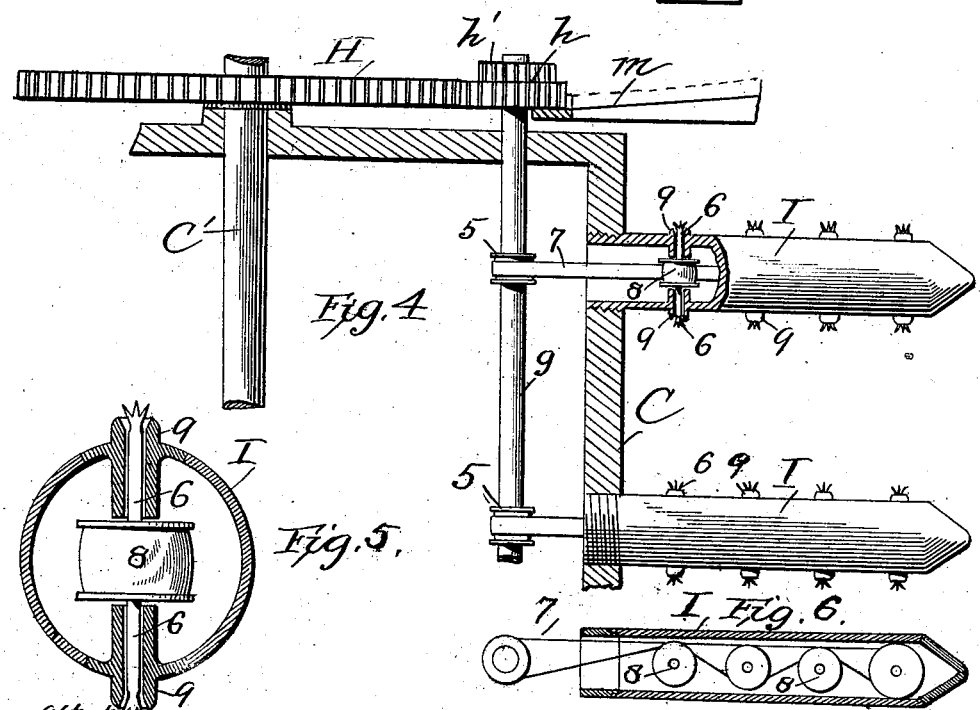

(No Model.)

P. P. HARING.
COTTON PICKING MACHINE.

No. 587,201.  Patented July 27, 1897.

3 Sheets—Sheet 3.

Attest  
Inventor  
Peter Paul Haring  
by Ellis Spear  
Atty.

UNITED STATES PATENT OFFICE.

PETER PAUL HARING, OF GOLIAD, TEXAS.

COTTON-PICKING MACHINE.

SPECIFICATION forming part of Letters Patent No. 587,201, dated July 27, 1897.

Application filed October 17, 1895. Serial No. 565,973. (No model.)

*To all whom it may concern:*

Be it known that I, PETER PAUL HARING, a citizen of the United States, residing at Goliad, in the county of Goliad and State of Texas, have invented certain new and useful Improvements in Cotton-Picking Machines, of which the following is a specification, reference being had therein to the accompanying drawings.

My invention relates to cotton-picking machines of that class in which the cotton-boll is caught on the end of a revolving picker.

The main feature of my invention consists of the combination of a revolving drum carried on a suitable frame and provided with fixed radial tubular arms set in the sides of the drum, the said tubular arms having on their sides, also set radially, hollow nipples carrying revolving pickers.

My invention also includes detail of construction and subordinate features and combinations, as hereinafter fully set forth, and all as illustrated in the accompanying drawings, in which—

Figure 1 shows the machine in plan view with part of the upper frame removed. Fig. 2 shows a rear view with vertical belts omitted. Fig. 3 shows a side elevation. Fig. 4 shows a part of one of the drums in vertical section with some of the arms in position. Fig. 5 shows a cross-section of one of the arms, with the picker in its nipple. Fig. 6 is a longitudinal section of one of the arms, and Fig. 7 shows the arm in another longitudinal section.

It will be observed that the parts are enlarged in some of the figures.

In the drawings the main frame is shown as supported on wheels A B, of which B B are in the rear and directly support the frame, the front wheels A A, Fig. 1, being on a truck, to which the front end of the frame is pivoted.

The frame is made with two sides, which are duplicates, connected by an overhead transverse part of the frame. The vertical parts of the frame are shown at $a$ and the transverse parts at $b$.

Mounted in the frame are vertically-arranged drums C, the shafts of which have their bearings in the frame. These drums are arranged in pairs, one on each side, and may be one or more pairs. I have shown two. The drums of each pair are side by side in the frame, and the pairs are so arranged that they straddle a row of plants and cause the plants of the row to pass between the pairs of drums as the machine advances.

The machine advances in the direction of the arrow 1, Fig. 1. The drums turn toward each other, as shown by the arrows 2, and the plants are drawn in between the arms.

The drums are caused to revolve by means of a sprocket-chain $d$, engaging with sprockets on the drum and moved by sprocket-wheels D on shafts $e$, geared to the rear axle, as shown in Fig. 3. The drums therefore run loose on their shafts $c'$, which are turned by means of sprocket-wheels $f$, which are connected to like wheels $f'$ $f'$ on the shaft $e$. Through these shafts motion is communicated to other shafts $g$, mounted in the heads of the drums, through gears H $h$. Small pulleys 5 on these shafts drive the picker-spindles 6. These shafts $g$ are located opposite the vertical rows of arms I, which extend radially. The arms I are also arranged in horizontal rows, as shown in Fig. 3, and the arms of opposite drums interlock sufficiently to cover all the space between the drums, they being set so that the vertical rows of one drum follow a vertical row of the opposite drum of the pair.

The horizontal rows of arms are placed at a distance intended to allow the bolls to pass between adjacent rows, and no more.

Within the arms is the driving belt or cord 7, as shown in Fig. 4. It engages with pulleys 8, fixed centrally on the picker-spindle 6, which has its bearing in hollow nipples 9, fixed in the walls of the arms I. These nipples are set in rows, one on the upper and one on the lower side of each arm, the said rows extending from near the drum to near the end of the arm and so arranged that every boll as it passes between the arms shall be caught by a picker. The pulleys 8 are held between the inner ends of the nipples, and the spindles turn in the nipples. On the outer ends of the spindle are teeth of any desired shape adapted to catch the cotton. I prefer to make these as shown more clearly in Fig.

7, in which they are shown as set on the end of the spindle and slightly flaring outward. It is particularly to be noted that these spindles are very loosely set in the nipples, so that there is a considerable free space in the nipple about the spindle, also that the outer ends of the nipples are beveled on the inner edges and rounded on the outer. I have found that the inner bevel and the loosely-set spindle prevent the cotton from binding and choking the spindle. The band or rope may be carried under and over the pulleys 8, as shown in Figs. 4 and 7. The nipples and picker ends project slightly from the arms, as shown in Fig. 4, for example, and as the arms are carried with the revolution of the drums they take the bolls met by the machine in its forward movement, and these bolls are compelled to pass between said arms. The pickers, kept in rotation at the points when the arms meet the bolls, catch onto the cotton and by twisting up over the points firmly grasp and pull the cotton from the boll and carry it aside as the drum turns.

After the arms have carried the cotton to the outside of the machine it is in position to be dropped upon a traveling belt or carrier.

In order to prevent stalks or empty bolls from passing into the space over the carriers, I set bars $g'$ in the framework in the frame of the machine on each side of the central space, through which the plants or stalks pass as the machine moves. These bars are fixed in the spaces between the planes in which the arms move and arrest any objectionable substances which may be dragged along with the cotton.

The carrier is shown in Figs. 2 and 3. In Fig. 3 is shown the longitudinal carrier, which is an endless belt 10, carried on drums 11 and 12. There is one of these belts on each side outside of the drum-shafts and directly under the outside half of the drums, where the cotton is dropped. These carriers have suitable teeth to catch the cotton and carry it forward to a vertical carrier 10', of similar construction, and mounted on drums 13' and 14'. This carrier delivers the cotton to the pocket $k$, as shown clearly in Fig. 3. The drum 11 is driven by sprocket connection with the rear axle, and the drum 12 is geared to the drum 13', so that the motion of the first carrier is communicated to the second. The pocket $k$ extends across the front of each side of the machine and the carriers 10 on both sides discharge into it from separate openings 1.

In order to release the cotton from the pickers, on which some part of it is twisted, it is necessary to arrest the rotation of the picker-spindles. For this purpose the beveled gear $h$ on the upper end of the shaft $g$ is splined, so that it can be lifted, and as the drum turns to bring any given vertical row of picker-arms to the outside from the carrier the gear $h$ strikes a cam-track $m$ and rides upon it, whereby it is lifted out of gear with the wheel H, and thus the shaft $g$ is freed from its normal driving mechanism. For the better release of the cotton from the picker I prefer to give a reverse turn to the picker-spindles, and this is done by causing the gear $h'$ on the bevel-gear, as it is raised, to engage with the segment $n$, toothed to engage with the gear $h'$. This slight reverse motion is given to the gear $h$, while the belt 10 is endless, and it is carried on the drums 11 and 12.

I claim—

1. In a cotton-picker, a vertically-arranged rotary drum having radially-set hollow arms, means for rotating the drum, the rotary pickers set within said arms transversely of the same, said pickers being disposed along the entire length of the arm and the means for rotating said pickers, substantially as described.

2. In a cotton-picker, the drums, the radial arms carried thereby, and the revoluble transverse spindles set within said arms and having pickers on each end thereof, substantially as described.

3. In combination with the hollow arms set in the rotary drum of a cotton-picking machine, the spindle-carrying picker-ends, and the nipples fixed to said arms and fitting loosely around said spindles and projecting into close proximity to said picker ends whereby the fiber gathered by the picker is prevented from wrapping about said spindle, substantially as described.

4. In combination with the hollow arms set in the rotary drum, of a cotton-picking machine, the rotary picker-spindle and the nipples fixed to said arm and fitted loosely about said spindle, said nipple having a beveled interior edge, substantially as described.

5. In combination with the hollow arms set in the rotary drum of a cotton-picking machine, the rotary picker-spindle and the nipple fixed to said arm and fitted loosely about said spindle, said nipple having a beveled interior and rounded outer edge, substantially as described.

6. In combination, the rotary drum with means for driving the same, the drum-shaft with means for rotating the same independently of said drum, the gear carried by said shaft, the shaft $g$, the gear carried thereby meshing with the gear on the drum-shaft, the radial arms, the picker-spindles journaled therein, the connection between said spindle and shaft $g$, the gear on the shaft $g$ meshing with the gear on the drum-shaft, and the cam arranged in the path of the gear on the shaft $g$ for lifting said gear out of mesh with the gear on the drum-shaft, substantially as described.

7. In combination, in a cotton-picking machine, the drum with means for driving the same, the drum-shaft with means for driving the same independent of the drum, the shaft $g$, the radial arms, the picker-spindles journaled therein, the gear carried by the shaft $g$ meshing with the gear on the drum-shaft, the cam for lifting the shaft $g$, the second gear carried thereby and the rack adapted to engage therewith for reversely rotating the shaft $g$, substantially as described.

8. In combination, the drum with means for driving the same, the drum-shaft with means for driving the same independently of said drum, the shaft $g$, the pinion carried thereby meshing with the gear on the drum-shaft, the radial arms, the picker-spindles arranged transversely of the same, the pulley carried by said spindles and the shaft $g$ and the belt connecting the same, substantially as described.

9. In combination, the frame, the drum carrying the radial arms, the driving means for said drum, the picker-spindles journaled in said arms transversely of the same, the pickers on each end of said spindles, the pulley carried by said spindles the shaft $g$ and the belt driven therethrough, said belt engaging the pulley on said spindles to drive the same and means for driving said shaft $g$, substantially as described.

In testimony whereof I affix my signature in presence of two witnesses.

PETER PAUL HARING.

Witnesses:
R. E. OURAND,
JAMES M. SPEAR.